United States Patent
Lubbe et al.

(10) Patent No.: US 10,928,536 B2
(45) Date of Patent: Feb. 23, 2021

(54) MAPPING CHEMOSTRATIGRAPHIC SIGNATURES OF A RESERVOIR WITH ROCK PHYSICS AND SEISMIC INVERSION

(71) Applicant: Saudi Arabian Oil Company, Dhahran (SA)

(72) Inventors: Rudi Lubbe, Dhahran (SA); Neil William Craigie, Dhahran (SA); Nikolaos Andreas Michael, Abqaiq (SA)

(73) Assignee: Saudi Arabian Oil Company, Dhahran (SA)

(*) Notice: Subject to any disclaimer, the term of this patent is extended or adjusted under 35 U.S.C. 154(b) by 398 days.

(21) Appl. No.: 15/834,981

(22) Filed: Dec. 7, 2017

(65) Prior Publication Data
US 2019/0179049 A1   Jun. 13, 2019

(51) Int. Cl.
*G06G 7/48* (2006.01)
*G01V 1/50* (2006.01)
(Continued)

(52) U.S. Cl.
CPC ............ *G01V 1/50* (2013.01); *E21B 41/0092* (2013.01); *E21B 49/00* (2013.01); *E21B 49/005* (2013.01); *E21B 49/02* (2013.01); *G01V 1/306* (2013.01); *G01V 1/345* (2013.01); *G01V 11/00* (2013.01); *G01V 2210/6169* (2013.01); *G01V 2210/6222* (2013.01); *G01V 2210/6224* (2013.01);
(Continued)

(58) Field of Classification Search
CPC .......... G01V 1/50; G01V 1/306; G01V 1/345; G01V 11/00; E21B 41/0092; E21B 49/005; E21B 49/02

USPC ....................................................... 703/9, 10
See application file for complete search history.

(56) References Cited

U.S. PATENT DOCUMENTS 5,838,634 A   11/1998   Jones et al.
6,302,221 B1  10/2001   Hamman et al.
(Continued)

FOREIGN PATENT DOCUMENTS

EP   3121625 A1    1/2017
WO   2016178094 A1  11/2016

OTHER PUBLICATIONS

Spence et al. (A chemostratigraphic investigation of the prehistoric Vavalaci lava sequence on Mount Etna: Simulating borehole drilling, 11 pages). (Year: 2011).*
(Continued)

*Primary Examiner* — Andre Pierre Louis
(74) *Attorney, Agent, or Firm* — Bracewell LLP; Constance G. Rhebergen; Christopher L. Drymalla

(57) ABSTRACT

Mapping is performed of chemostratigraphic signatures of hydrocarbon reservoirs in three dimensions. Up-scaled chemostratigraphic data from well cuttings and well cores are tied with high-resolution elastic wireline data at well locations in the reservoir. The wireline data is used to determine suitable seismic attributes for mapping the desired chemostratigraphic property, and are obtained by performing pre- and/or post-stack inversions. A multi-attribute template, derived from the well data, is developed to characterize the reservoir in terms of its chemostratigraphic properties. The seismic data is then inverted to map the chemostratigraphic signatures of reservoir in three dimensions.

9 Claims, 11 Drawing Sheets

(51) Int. Cl.
*E21B 41/00* (2006.01)
*E21B 49/00* (2006.01)
*E21B 49/02* (2006.01)
*G01V 1/34* (2006.01)
*G01V 1/30* (2006.01)
*G01V 11/00* (2006.01)

(52) U.S. Cl.
CPC ............... *G01V 2210/6242* (2013.01); *G01V 2210/6246* (2013.01)

(56) References Cited

U.S. PATENT DOCUMENTS

| | | | |
|---|---|---|---|
| 7,373,251 B2 * | 5/2008 | Hamman | G01V 1/306 |
| | | | 702/14 |
| 8,095,345 B2 | 1/2012 | Hoversten | |
| 8,096,543 B2 | 1/2012 | Toyoizumi et al. | |
| 8,098,543 B2 | 1/2012 | Bachrach et al. | |
| 8,473,213 B2 | 6/2013 | Zhu et al. | |
| 8,577,660 B2 | 11/2013 | Wendt et al. | |
| 9,223,041 B2 * | 12/2015 | Wendt | G01V 1/28 |
| 9,453,929 B2 | 9/2016 | Schmedes et al. | |
| 2011/0246159 A1 | 10/2011 | Herwanger et al. | |
| 2012/0059633 A1 | 3/2012 | Dutta et al. | |
| 2012/0109604 A1 * | 5/2012 | Chen | G01V 11/00 |
| | | | 703/2 |
| 2013/0013209 A1 | 1/2013 | Zhu et al. | |
| 2014/0025304 A1 | 1/2014 | McLennan et al. | |
| 2015/0362623 A1 | 12/2015 | Miotti et al. | |
| 2016/0349389 A1 | 12/2016 | Walters et al. | |
| 2019/0025461 A1 * | 1/2019 | Wiener | E21B 43/26 |

OTHER PUBLICATIONS

Craigie, N.W. et al; "Chemostratigraphy of the Ordovician Sarah Formation, North West Saudi Arabia: An Integrated approach to reservoir correlation"; Marine and Petroleum Geology, 77, 2016, 1056-1080.

Lubbe, R. et al; "Rock Physics Guided Quantitative Seismic Inversion" Third EAGE Workshop on Rock Physics, 2015, Istanbul Turkey.

Castillo et al., "Integrating surface seismic, microseismic, rock properties and mineralogy in the Haynesville shale play", first break, 2014, pp. 71-77, vol. 32, EAGE.

The International Search Report and Written Opinion for related PCT application PCT/US2018/064518 dated Mar. 1, 2019.

* cited by examiner

MAPPING CHEMOSTRATIGRAPHIC SIGNATURES OF A RESERVOIR WITH ROCK PHYSICS AND SEISMIC INVERSION

BACKGROUND OF THE INVENTION

1. Field of the Invention

The present invention relates to rock physics modeling of subsurface formations, and more particularly to mapping chemostratigraphic signatures of the reservoir over its three-dimensional extent to indicate reservoir properties indicating the presence of hydrocarbons.

2. Description of the Related Art

In reservoir planning and engineering, an understanding of the nature and characteristics of subsurface rock of the formations of the reservoir, and the properties of such rock are important for hydrocarbon exploration and development. The nature and characteristics of the rock are known as its facies. The facies of a subsurface rock indicates its origin, and permit analysts to differentiate it from other adjacent rock formations.

Among the properties of a subsurface rock is its permeability. Permeability is a measure indicative of the relative ease or difficulty of fluid flow through a rock at a given pressure. Higher permeability in a rock formation indicates that fluids such as oil, gas and water may flow more freely through a particular rock formation. Lower permeability as a rock property indicates greater difficulty in fluid flow.

Drilling operational programs with regard to subsurface hydrocarbon reservoirs can be influenced by both the facies and the permeability of the formation rock in the reservoirs. Knowledge of the facies and properties of formation rock in situ beneath the surface of the earth is available from core samples extracted from walls of the formations adjacent well boreholes as well as from measurements obtained with wireline well logging tools lowered through well boreholes to depths of interest adjacent the formations.

The measures of properties and facies of the rock so obtained are indicative of locations in the reservoir for a depth of interest to only a limited lateral distance away from the borehole. Further, conditions nearest the borehole can have significant effects on the measures of properties and facies of the rock.

Wells in a reservoir are drilled into reservoirs at locations spaced considerable lateral distances from each other in the reservoir, particularly at early stages of development of the reservoir. Thus, measures of properties and facies of the rock from well boreholes do not indicate rock facies and permeability at locations distant from well boreholes. Direct knowledge of rock facies and permeability at reservoir locations away from well boreholes can only be obtained directly by further and costly wells drilled at such locations.

SUMMARY OF THE INVENTION

Briefly, the present invention provides a new and improved method of drilling a well in a subsurface geological structure to a location in a subsurface hydrocarbon reservoir indicated by rock physics modeling of chemostratigraphic signatures of formations of the subsurface hydrocarbon reservoir over its three-dimensional extent to indicate reservoir properties. Wireline well logging measures are obtained from wells in the reservoir representing properties of the subsurface reservoir for processing in a data processing system. The wireline well logging measures are analyzed to indicate properties of the reservoir as functions of well depth in the reservoir. A chemostratigraphic analysis of core and cutting samples from the wells in the reservoir is performed to indicate relative presence of chemical elements as functions of well depth in the reservoir. Indications of attributes of interest in the reservoir formations are formed with attribute templates. A seismic inversion of formation attributes is then performed to indicate chemostratigraphic properties for reservoir regions located between wells in the reservoir. A rock physics model map is then formed of chemostratigraphic properties of formations of the subsurface hydrocarbon reservoir over its three-dimensional extent to indicate reservoir regions located between wells in the reservoir as prospects for drilling of a well. A well is then drilled in the subsurface geological structure to a location in a subsurface hydrocarbon reservoir indicated by the mapped rock physics model.

DETAILED DESCRIPTION OF THE PREFERRED EMBODIMENTS

Figure 1:
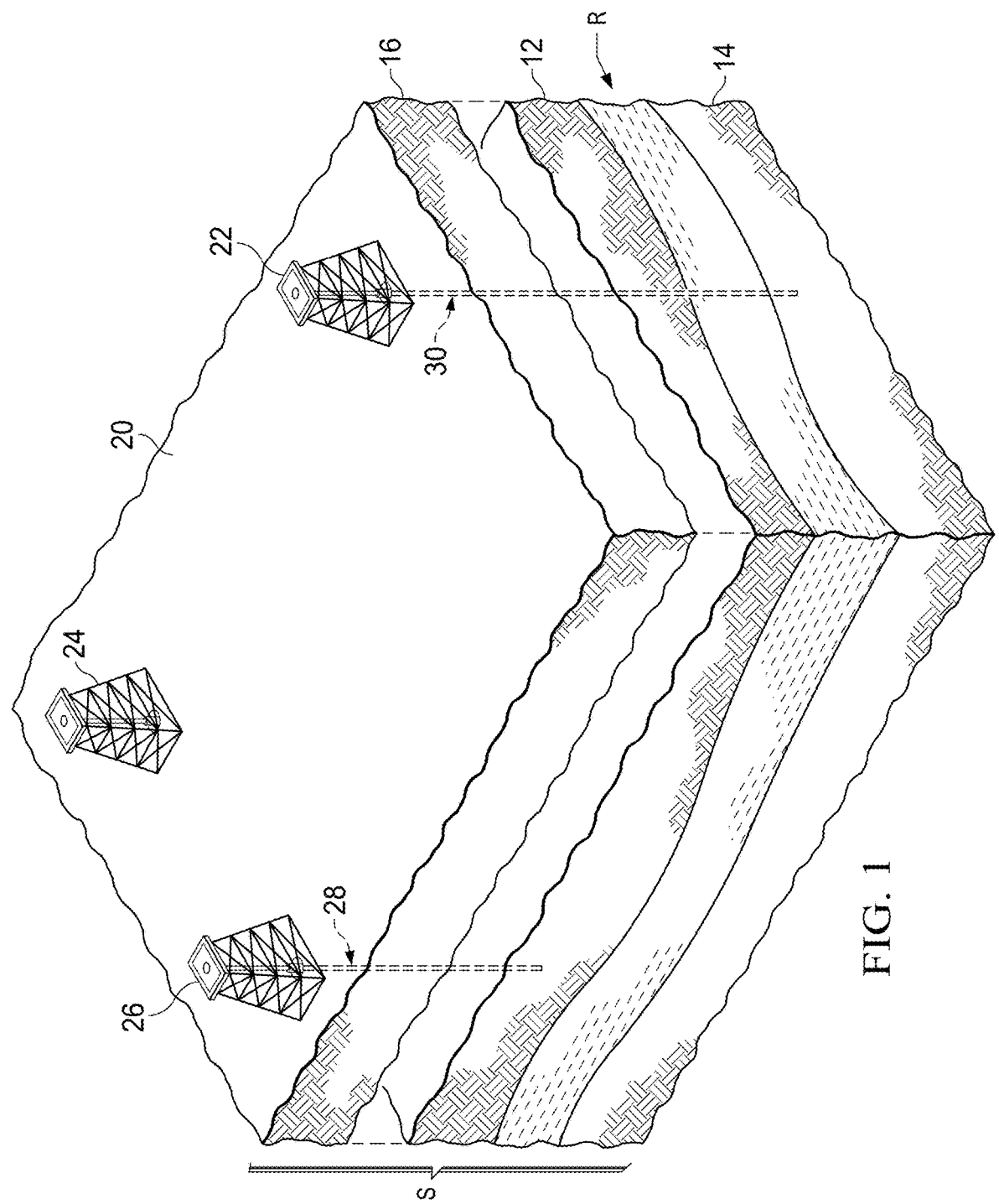
FIG. 1 is a schematic diagram of three dimensional subsurface formations in the earth at a location of interest for determining reservoir properties indicating the presence of hydrocarbons.

In the drawings, FIG. 1 is an isometric view in schematic form of a subsurface geological structure S or formations in the earth at a location where a subsurface hydrocarbon reservoir R in the form of a hydrocarbon producing formation rock layer is present. As shown in FIG. 1, the hydrocarbon producing formation rock layer is present beneath several other formation rock layers, such as indicated at 12 and 16 below the earth surface 20, and above a rock layer 14.

As indicated at 22, 24 and 26, exploratory or production wells have been drilled to penetrate the earth formations through wellbores as indicated at 28 and 30.

As has been set forth, knowledge of facies and properties of formation rock in situ beneath the surface of the earth is available from core samples extracted from walls of the formations adjacent to well boreholes. Knowledge of facies and properties of formation rock is also available from measurements obtained with wireline well logging tools lowered through well boreholes to depths of interest adjacent to the formations. Drilling operational programs with regard to subsurface hydrocarbon reservoirs are subject to influence from each of facies, porosity, water saturation and permeability of the formation rock in the reservoirs.

Measures of properties and facies of the rock are indicative of locations, however, in the reservoir for only a limited lateral distance away from the well borehole. Wells in a reservoir are drilled into reservoirs at locations spaced considerable lateral distances from each other in the reservoir, particularly at early stages of development of the reservoir. Thus, so far as is known, measures of properties and facies of the rock from well boreholes do not indicate rock facies and permeability at locations distant from well boreholes.

The present invention provides a methodology for mapping the 3-D chemical composition of a subsurface reservoir, such as the reservoir R, and then relating these chemical signatures to important reservoir attributes (e.g., seal trap, maturity and source rock). These attributes are quantified and thus enable drilling operations for wells in the reservoir with increased potential of success in drilling a prospect well.

Chemostratigraphy is a reservoir correlation technique involving the application of inorganic geochemical data. Chemostratigraphy has been used to define chemostratigraphic zones with unique geochemical signatures that could be recognized in adjacent wells. This technique is described, for example, in connection with define chemostratigraphic zones with unique geochemical signatures that could be recognized in adjacent wells in: Craigie, N. W. (a named co-inventor of the present application), Rees, A., MacPherson, K. and Berman, S., 2016. "Chemostratigraphy of the Ordovician Sarah Formation, Northwest Saudi Arabia: an integrated approach to reservoir correlation", Marine and Petroleum Geology, 77, 1056-1080. Chemostratigraphic analysis is performed on core and cutting samples taken at specified intervals in selected wells of interest in the reservoir R. The samples are then cleaned, treated and processed to remove extraneous materials. Sample fragments representative of known lithologies at specific depths in the well are then selected for analysis.

Geochemical data are acquired using the ICP-OES (Inductively Coupled Plasma-Optical Emission Spectrometry), ICP-MS (Inductively Coupled Plasma-Mass Spectrometry) and/or XRF (X-ray Fluorescence) methods. A total of 45-55 elements are analyzed from Na through U in the periodic table.

In many studies, a combination of ICP-OES and ICP-MS is applied as the former is utilized to generate data for major (e.g., Si, Al, K, Na) and high-abundance trace elements (e.g., Ba, Sr, Zr), whilst concentrations of low abundance trace elements (e.g., Cs, Ta, Nb) and rare earth elements (e.g., La, Ce, Gd, Yb, Lu) are obtained via ICP-MS. An alternative analytical option is XRF. This is favored is some studies and analysis/sample preparation is much quicker than ICP and data are normally acquired at a lower cost. However, the drawback is that number of elements analyzed is generally lower (typically around 45 for XRF, compared with 55 by ICP) and detection limits are less favorable (around 1-5 ppm for most elements by XRF, and 1 ppb for ICP).

Data for the major elements are quoted as wt. % oxide values. For the purposes of simplicity and brevity, in the present application symbols rather than full oxide symbols are referred to in the specification. For example, Mn is used rather than MnO to identify manganese data. For trace and rare earth elements units of data measure are in ppm (parts per million). Data may be acquired from core, sidewall core, ditch cuttings or field samples, with only 0.25 g and 3 g of material required for ICP and XRF analysis respectively.

Figure 2:
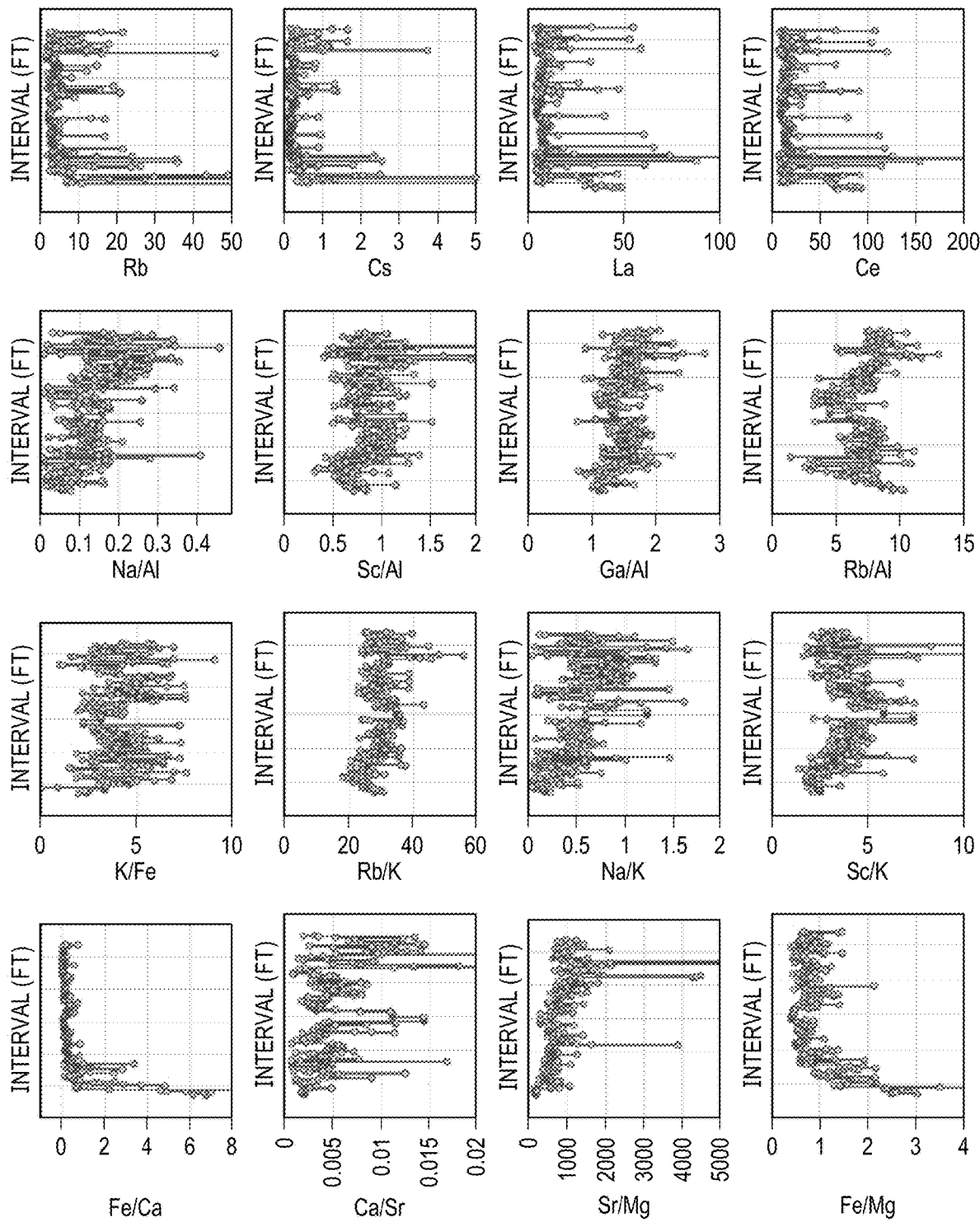
FIG. 2 is an example display of results of chemostratigraphic analysis of a well in a subsurface reservoir.

The next stage of most studies involves plotting of elemental data and ratios in the form of profiles (FIG. 2) and the identification of correlative zones and markers based on variations in particular elements and elemental ratios. A display of the results of an example typical chemostratigraphic analysis, from well rock samples, is shown in FIG. 2. In addition to the identification of such zones/markers, it is often possible to model other properties such as mineralogy, porosity and permeability, through stochastic modeling. For example, there is often a linear inverse relationship between K and permeability where K is associated with pore occluding illite. If it is possible to relate specific concentrations of K to values of illite, it may also be possible to estimate permeability based on concentrations of this element. This mapping technique of attributes forms templates known as Rock Physics Templates (RPTs) and is described, for example, in connection with mapping conventional reservoir properties (e.g., porosity and saturation) in: Lubbe, R. (a co-inventor of the present application) and El Mardi, M., 2015, "Rock Physics Guided Quantitative Seismic Inversion" Third EAGE Workshop on Rock Physics, Istanbul Turkey.

FIG. 2 is an example of results from a chemostratigraphic analysis of relative presence as functions of depth over a common interval in a reservoir of: the presence of the elements rubidium (Rb), cesium (Cs), lanthanum (Ln) and cerium (Ce); and the ratios of the relative presence of elements sodium/aluminum, scandium/aluminum; gallium/aluminum; rubidium/aluminum; potassium/iron; rubidium/potassium; sodium/potassium; scandium/potassium; iron/calcium; calcium/strontium; strontium/magnesium; and iron/magnesium. It should be understood that the results shown in FIG. 2 are examples and relative presences of other elements and ratios of the relative presence of other elements may be used as well.

The Table below is an example of results from a chemostratigraphic analysis describing the relative presence of a few elements as functions of discrete depths over a common interval in an example well showing the aluminum (Al), manganese (Mn); magnesium (Mg); calcium (Ca); strontium (Sr); potassium (K); silicon (Si); iron (Fe); sodium (Na); scandium (Sc); gallium (Ga) and rubidium (Rb). Again, it should be understood that the results shown in the Table below are examples, and that relative presences of other elements and ratios of the relative presence of other elements may be used as well.

TABLE 1

| Depth | Al | Mn | Mg | Ca | Sr | K | Si | Fe | Na | Sc | Ga | Rb |
|---|---|---|---|---|---|---|---|---|---|---|---|---|
| $Z_1$ | 10.8013 | 0.0122 | 0.6136 | 0.2753 | 130.0284 | 3.6302 | 77.7525 | 1.8538 | 0.8366 | 7.6756 | 11.9716 | 101.2692 |
| $Z_2$ | 13.2426 | 0.0070 | 0.7419 | 0.2733 | 127.7652 | 4.3884 | 72.6786 | 1.8386 | 0.7361 | 11.0941 | 15.7327 | 135.9351 |
| $Z_3$ | 12.6785 | 0.0066 | 0.7059 | 0.2879 | 140.8298 | 4.2733 | 76.1288 | 1.7644 | 0.7566 | 10.7660 | 14.2362 | 127.3444 |
| $Z_4$ | 12.5554 | 0.0064 | 0.6690 | 0.2570 | 139.5953 | 4.1654 | 75.6620 | 1.7228 | 0.7236 | 10.2256 | 14.2263 | 119.4612 |
| $Z_5$ | 12.3707 | 0.0060 | 0.6447 | 0.2493 | 134.9661 | 4.0907 | 76.1897 | 1.6527 | 0.6672 | 9.9447 | 14.0766 | 117.5409 |
| $Z_6$ | 11.8476 | 0.0052 | 0.5683 | 0.2411 | 108.2198 | 3.8926 | 77.2552 | 1.6811 | 0.5937 | 7.9453 | 11.8619 | 101.1681 |
| $Z_7$ | 11.3860 | 0.0054 | 0.5598 | 0.2605 | 116.3466 | 3.8366 | 76.7275 | 1.5115 | 0.4923 | 7.8325 | 12.4006 | 105.7161 |
| $Z_8$ | 11.7963 | 0.0050 | 0.5303 | 0.2519 | 122.8274 | 4.1146 | 77.6307 | 1.2342 | 0.2733 | 8.1627 | 11.9217 | 99.9149 |
| $Z_9$ | 11.6527 | 0.0052 | 0.4999 | 0.2577 | 110.9973 | 4.0326 | 76.4941 | 1.1956 | 0.1871 | 7.3250 | 12.5702 | 106.3225 |
| $Z_{10}$ | 1.2873 | 0.7597 | 0.7890 | 0.1550 | 31.5607 | 0.4186 | 80.5735 | 8.5052 | 0.0593 | 1.4785 | 2.1200 | 10.7940 |
| $Z_{11}$ | 0.8668 | 0.0212 | 0.0855 | 0.1354 | 49.3984 | 0.2665 | 93.5424 | 0.2981 | 0.0929 | 0.6348 | 1.1722 | 7.1222 |
| $Z_{12}$ | 1.0535 | 0.0023 | 0.0698 | 0.1457 | 56.4348 | 0.3316 | 94.3137 | 0.0995 | 0.1700 | 0.8047 | 1.4506 | 8.0955 |
| $Z_{13}$ | 0.9248 | 0.0015 | 0.0655 | 0.1300 | 38.9365 | 0.2849 | 95.9982 | 0.0840 | 0.0724 | 0.7523 | 1.4037 | 6.8614 |
| $Z_{14}$ | 1.0781 | 0.0022 | 0.0782 | 0.1605 | 83.4383 | 0.3333 | 95.9678 | 0.1100 | 0.1088 | 0.7299 | 1.4875 | 8.6372 |
| . | 4.2723 | 0.0026 | 0.1760 | 0.2127 | 103.6935 | 1.2654 | 90.7518 | 0.2754 | 0.1734 | 2.4218 | 5.1887 | 27.2376 |
| . | 2.4752 | 0.0024 | 0.1278 | 0.1913 | 87.3165 | 0.7575 | 93.1162 | 0.2008 | 0.3845 | 1.5790 | 3.2912 | 18.0304 |
| . | 12.2989 | 0.0040 | 0.4275 | 0.1916 | 110.3801 | 3.7962 | 78.5237 | 0.9265 | 0.1948 | 7.1035 | 13.2586 | 94.9626 |
| . | 11.0578 | 0.0041 | 0.3817 | 0.2149 | 104.3107 | 3.7443 | 82.0856 | 0.7967 | 0.1838 | 6.5385 | 11.9217 | 90.8491 |
| . | 11.3655 | 0.0044 | 0.3822 | 0.2752 | 102.7779 | 3.7681 | 78.4628 | 0.7861 | 0.1947 | 6.8543 | 12.3507 | 91.0311 |
| . | 1.6669 | 0.0018 | 0.0909 | 0.1759 | 58.3687 | 0.4675 | 92.9336 | 0.1350 | 0.1108 | 1.0786 | 2.1060 | 11.6429 |
| $Z_N$ | 4.6201 | 0.0021 | 0.1568 | 0.1523 | 131.2628 | 1.3307 | 89.6863 | 0.2665 | 0.1800 | 3.2001 | 5.8651 | 29.7137 |

Thus, chemostratigraphic data in the form of measures of information about relative presences of chemical elements, and ratios of the relative presence of such elements can be seen as a chemical description down a wellbore in a reservoir. These data measures are generally sparse but very important for predicting reservoir attributes. As noted, reservoir attributes of subsurface rock of the formations of a reservoir, and in particular permeability, porosity, water saturation and volumetric composition of the host rock, in regions located in inter-well areas are important for hydrocarbon exploration and development.

Once significant problem with the application of geochemical data is that it is only obtained from well locations, making it very difficult or impossible to correlate zones/markers or predict reservoir properties in inter-well areas. Thus, sub-regional interpretations relating to reservoir attributes and correlations, is currently very difficult.

The present invention provides a methodology to obtain measures of relative presences of elements and ratios of the relative presence of these chemical compositions and link these sparse chemostratigraphic data measures (recorded at limited well locations) to seismic attributes (obtained from the inversion of 3-D seismic reflectivity data), by means of a Rock Physics Template.

The present invention provides the ability to characterize a reservoir in terms of a particular reservoir property of interest (e.g., its mineral composition (reservoir), fluid composition (pay), reservoir porosity, etc.). High resolution wireline data obtained from well logging at the well location, generally acquired at 0.5 ft. intervals, can be used to forward model various expected seismic attribute responses.

Figure 3:
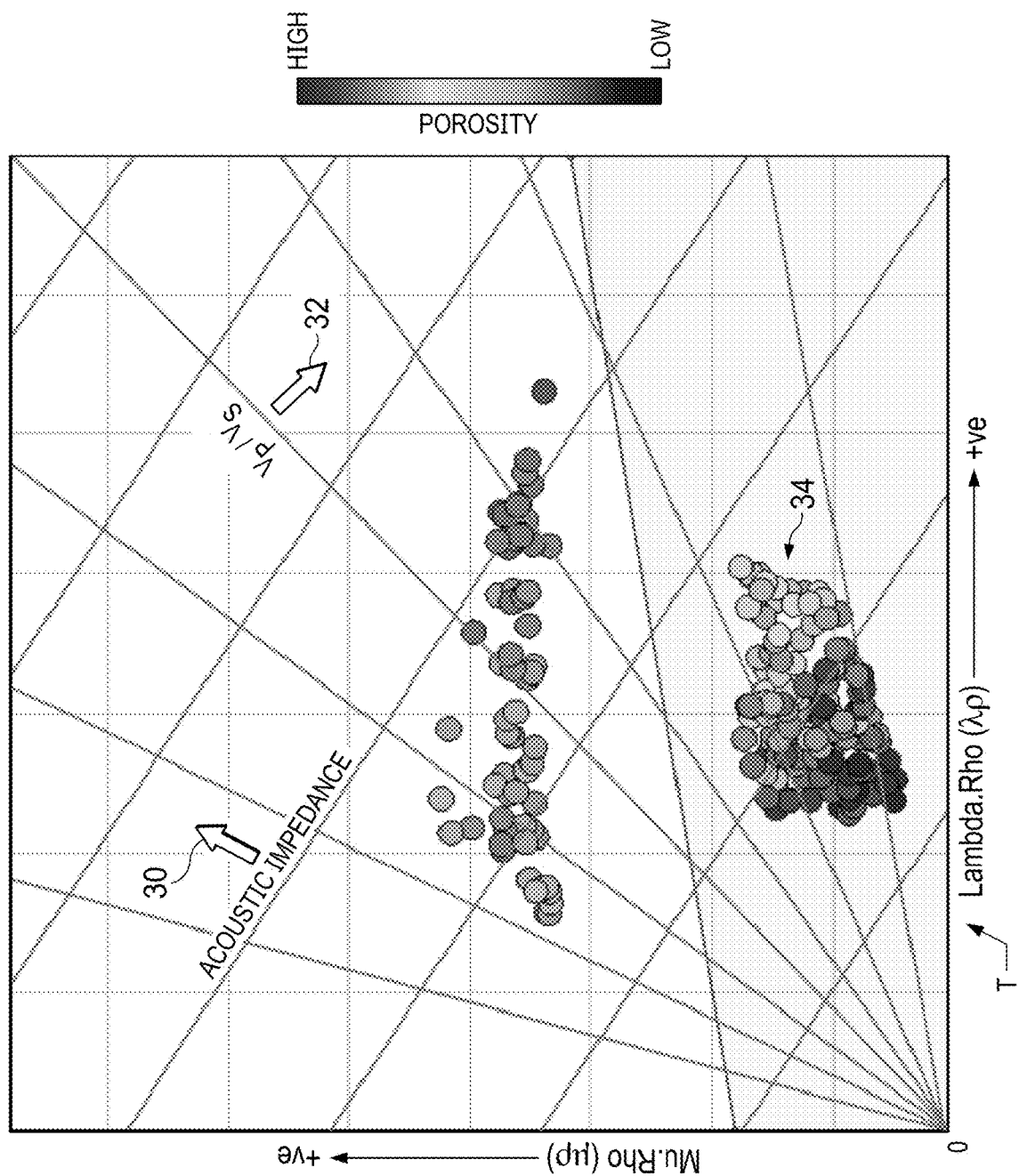
FIG. 3 is an example display of a multi-attribute template according to the present invention.

FIG. 3 is a plot of what is known as a rock physical template T which is used for elastic attribute analysis. The article previously referenced by co-inventor Lubbe describes formation of this type of Rock Physics Template in connection with mapping conventional reservoir properties (e.g., porosity and saturation) with the aid of seismic inversion. FIG. 3 is what is known as a LambdRho ($\lambda\rho$) versus MuRhu ($\mu\rho$) display (or LMR cross-plot) where the data is colored by conventional reservoir properties (in this case porosity). The present invention utilizes the template to map the chemostratigraphic data measures (e.g., the rubidium/aluminum ratio Rb/Al in 3-D).

The Rock Physics Template T of FIG. 3 is formed by mathematically transforming the 1-D recorded wireline elastic data (i.e., compressional wave velocity $V_P$, shear wave velocity $V_s$ and bulk density $\rho$) at the exploration well locations, into seismic impedance attribute data that one can obtain through performing a conventional inversion of the recorded seismic reflectivity data. The seismic attributes and related compressional and shear wave velocities, are all functions of the rock moduli (i.e., bulk modulus, or K and shear modulus, or $\mu$) as well as the bulk density $\rho$. The optimum template is chosen based on the results of the inversion feasibility study at the wells performed in the rock physics analysis phase of the process (step 50 in FIG. 5). The seismic data is then inverted and the inversion results so obtained are then plotted in the optimum Rock Physics Template T, in this particular case, in a form known as an LMR or LambdaRho ($\lambda\rho$) versus MuRho ($\mu\rho$) display (or LMR cross-plot) with unit measures of pressure in gigapascals (GPa).

A Rock Physics Template such as the template T of FIG. 3 indicates optimum attribute ranges to map high porosity zones within 3-D spatial extent of the inverted seismic cube described above. The Rock Physics Template T of FIG. 3 is a multi-attribute Rock Physics Template that highlights the optimum attribute ranges to be applied to the inverted seismic volumes in order to isolate, in this case, the higher porosity zones in the reservoir. An arrow 30 indicates the direction of increasing acoustic impedance (AI) in the template T, while an arrow 32 indicates the direction of increasing compressional wave velocity to shear wave velocity ($V_P/V_s$). The data points plotted in FIG. 3 are color-keyed by the reservoir porosity within the reservoir. Data points as indicated at 34 in the lower central portion of the template T are indicated as highest porosity regions within the seismic volume of survey results from the reservoir R. The present invention color codes the template by a chemostratigraphic property (e.g., the rubidium/aluminum ratio (Rb/Al)) obtained from a chemostratigraphic analysis carried out on a number of wells penetrating the reservoir R within the seismic survey.

The present invention thus provides a rock physics-guided seismic inversion workflow to map the chemostratigraphic (i.e., chemical) analysis of formation rock by means of Rock Physics Templates such as shown in FIG. 3 built from elastic (i.e., physical) wireline logging measures obtained from wells in a reservoir.

Figure 4:
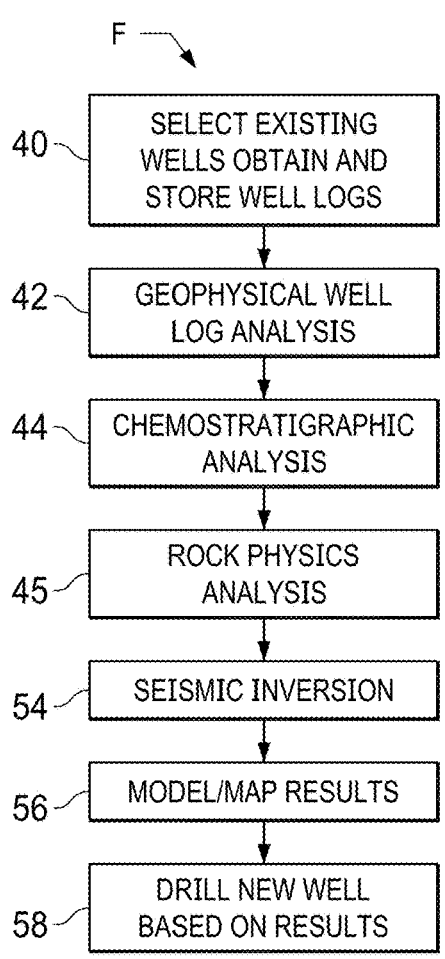
FIG. 4 is a schematic diagram of the process of mapping chemostratigraphic signatures of a reservoir according to the present invention.
Figure 5:
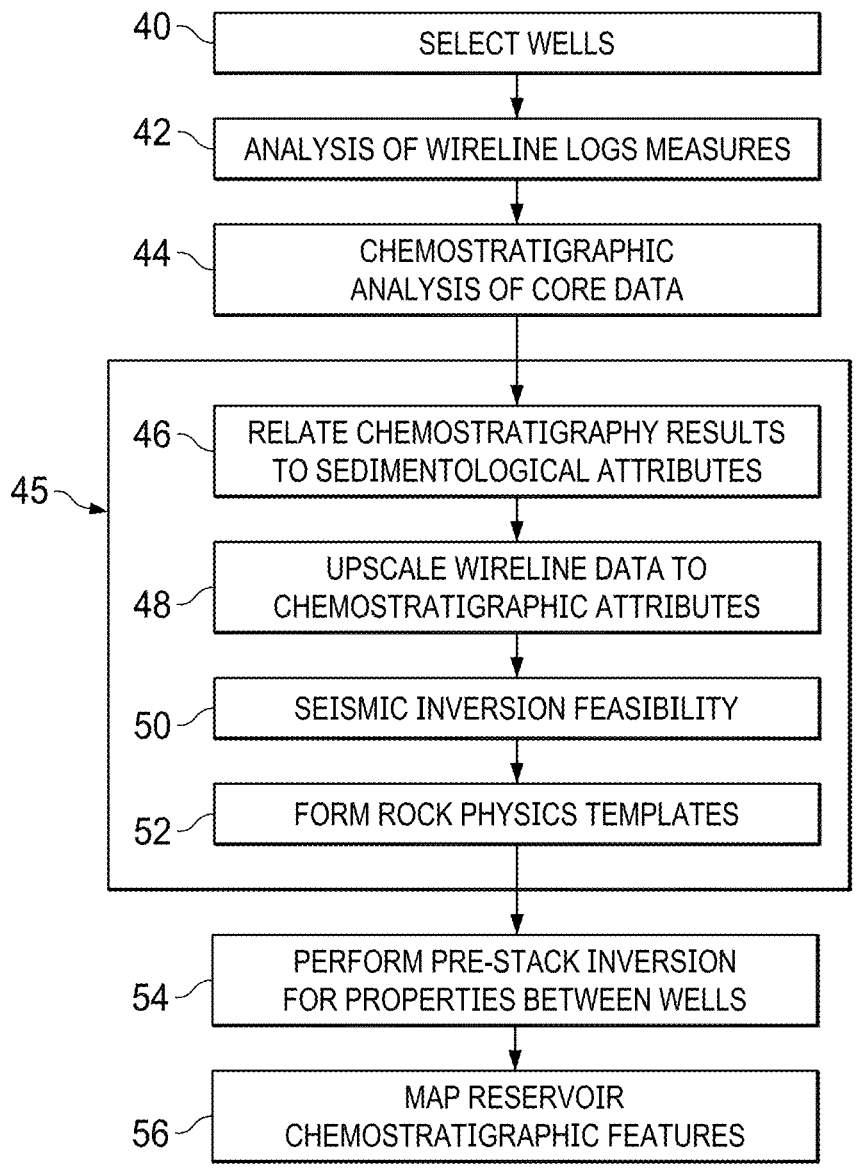
FIG. 5 is a schematic diagram in more detail of the process of mapping chemostratigraphic signatures of a reservoir of FIG. 4.

FIG. 4 is a schematic diagram of a workflow F outlining the sequence according to the present invention for drilling a well in a subsurface geological structure to a location in a subsurface hydrocarbon reservoir highlighted by a desired chemostratigraphic signature of the reservoir with rock physics guided seismic inversion. FIG. 5 is a more detailed schematic diagram of portions of the method sequence of the workflow F of FIG. 4.

As indicated at step 40 in FIG. 4, a certain number of existing wells already drilled in the reservoir R, such as those shown at 22, 24 and 26 in FIG. 1 are selected. The existing well from which selection is made are initially ones which do not only penetrate the reservoir of interest R, but also ones which are within the seismic survey as this data will be inverted. Secondly, the wireline well log data need to have been obtained to aid in the building of the Rock Physics Template, and finally ones from which core and/or cutting samples were taken as these will be used for the chemostratigraphic analysis.

The selection of the most suitable wells, among of the existing wells for the calculation of the Rock Physics Template during step 40, is based on several criteria. The wells should penetrate the reservoir of interest and should spatially be well-distributed within the seismic volume covering the prospect area. The wells should contain core data which are to be used for the chemostratigraphic analysis. The wells should contain measured elastic wireline data (i.e., compressional wave velocity, shear wave velocity and density logs). The wells should have fluid data (e.g., reservoir pressure, reservoir temperature, API, Gas-Oil-Ratio and Gas Gravity) to allow for the wireline data to be conditioned/predicted, if necessary.

Next, as indicated at step 42, a geophysical well log analysis is performed of the wireline data from the wells selected during step 40. The wireline data should be carefully conditioned prior to the generation, during step 42, of any pre-stack inversion attributes at the well locations. This step conventionally involves the generation of compressional wave velocity $V_P$ versus shear wave velocity $v_s$ (i.e., $V_P$ versus $V_s$) and compressional wave velocity $V_P$ versus bulk density $\rho$ (i.e., $V_P$ versus $\rho$) cross-plots. Lithology specific trends on these plots will highlight erroneous data that will be inconsistent with the petrophysical evaluation. The data is then corrected to account for these erroneous or missing data particularly in the bad hole sections of the wells.

Step 44 involves performing a chemostratigraphic analysis using core and/or cutting samples in the manner described above at each well within the reservoir interval of interest which is selected as a result of step 40. Step 45 (FIG. 4) involves a rock physics analysis, details of which are shown in the steps of FIG. 5. During step 46 (FIG. 5) of the rock physics analysis, the chemostratigraphic data is compared with core data. By integrating the two datasets, it is then possible to use the geochemical/chemostratigraphic data to model stochastically depositional environments, facies, lithology, porosity and permeability in previously uncored intervals.

In step 48 (FIG. 5) the conditioned elastic wireline data are blocked (or up-scaled) to resemble the same sampling interval as the chemostratigraphic data. The chemostratigraphic data obtained from core and/or cuttings is generally sparse, discrete and irregularly sampled along the borehole whereas the elastic data (i.e., compressional wave velocity, shear wave velocity and bulk density), from wireline tools, are of much higher resolution and are routinely acquired at 0.5 ft. intervals down the well. Thus, in every well, the conditioned elastic logs will be discretely blocked to resemble the same sampling interval as that of the chemostratigraphic data to ensure that the elastic data can be related to the chemostratigraphic data at the same exact depth. This process is called up-scaling.

Step 50 (FIG. 5) involves a seismic inversion feasibility study being performed using all the chemostratigraphic data from all the wells. This involves the construction of Rock Physics Templates. All possible combinations of elastic attributes obtainable by means of a pre- or post-stack inversion are displayed in matrix plots similar to that shown in FIGS. 7A 7B, 8A and 8B. The attribute data are colored by a particular chemostratigraphic property of interest, within the reservoir interval, over a number of wells. A clustering of the data by color, in a particular cross-plot template, indicates potential viability that the desired chemostratigraphic property could be mapped using that particular elastic attribute combination (FIG. 3). This optimum combination of elastic attributes then in addition also indicates the type of seismic inversion required (i.e., either pre- or post-stack). The suitability of the seismic reflectivity data for this particular type of inversion is then investigated and the seismic data will be conditioned appropriately. The 3-D seismic reflectivity data is then inverted resulting in the seismic impedance cubes.

The inverted seismic data can then be transformed to the reservoir attributes or properties of interest, using Rock Physics Templates derived from the well data as a guide (FIG. 3). The 3-D inverted seismic data, between the stratigraphic horizons encapsulating the reservoir of interest, is displayed on the optimum elastic attribute plot defined in the rock physics inversion feasibility study described in the previous phase. The optimum attribute ranges are then applied to the inverted seismic volumes (e.g., the light blue area in FIG. 3). This will then result in the highlighting/mapping of the particular reservoir property (or desired chemostratigraphic property in this invention) in 3-D. These highlighted geo-bodies then indicate potential new drilling locations in-between the exploration wells within the seismic volume.

In step 52 (FIG. 5) a Rock Physics Template of the form of the template T shown in FIG. 3 is formed in the manner described above, based on the optimum elastic attributes, as defined in step defined in step 50. An (absolute) pre-stack inversion is then obtained during step 54 to characterize the chemostratigraphic properties in-between the exploration wells.

During step 56, the chemostratigraphic data is mapped into a three-dimensional or 3-D model using chemostratigraphic, rock physics-guided, seismic inversion obtained as a result of the preceding processing steps.

Based on the model of chemostratigraphic properties of interest of a subsurface reservoir over its three-dimensional x, y, z co-ordinate (3-D) extent by means of rock physics guided inversion according to the present invention, a new well can then be drilled, as indicated at step 58 (FIG. 4).

The present invention solves the problem of mapping chemostratigraphic properties in-between the wells. It allow for a way to optimally utilize chemostratigraphic data to be used more effectively in exploration and prospect generation.

The workflow process described here depicts a robust way to utilize sparse chemostratigraphic data from core, high-resolution but spatially limited 1-D well data, and laterally extensive 3-D seismic data (all at different scales) for the very first time.

As an actual example, four (4) wells were selected for an initial pilot project in a field within Saudi Arabia. Each of the four selected wells had a complete chemostratigraphic log analysis over a clastic reservoir interval. The wireline data was conditioned prior to the generation of any pre-stack inversion attributes to remove/fix any spurious wireline data.

Figure 6A:
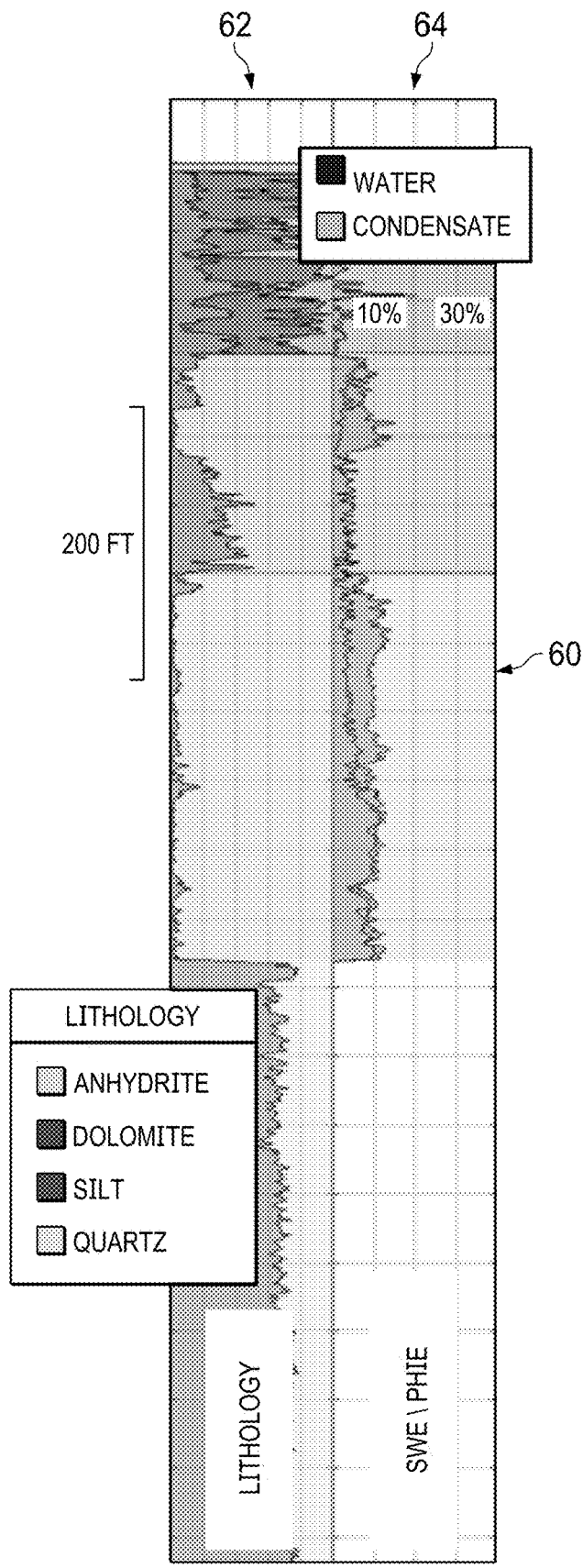
FIG. 6A is a diagram of plots of well logging results indicating formation lithology and attributes as a function of well borehole depth in a subsurface reservoir.
Figure 6B:
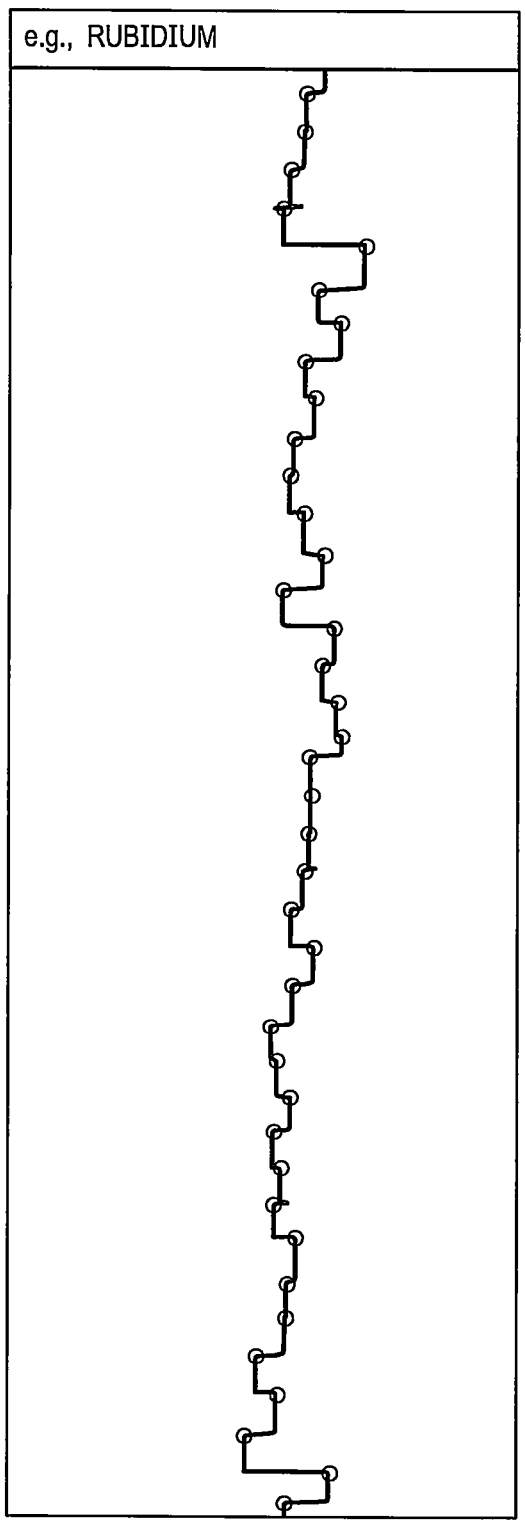
FIG. 6B is a diagram of a chemostratigraphic property of subsurface formations adjacent a well borehole in a subsurface reservoir as a function of depth.
Figure 8:
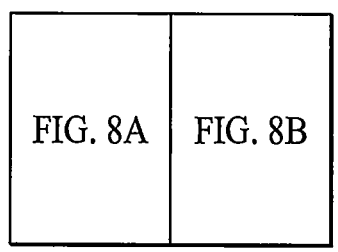
FIG. 8 is a diagram depicting the relation between FIGS. 8A and 8B.

FIG. 6B is a display of a chemostratigraphic property (e.g., in particular here the rubidium relative presence) as a function of wellbore depth, indicated for data points from a light blue interval shown at 60 (FIG. 6A) for depths where chemostratigraphic analysis has been performed. Here the data has been blocked or up-scaled, as described in step 48 in FIG. 5, for utilization in the Rock Physics Template, as described in step 50 in FIG. 5, to allow for the seismic elastic attribute data to be colored by the chemostratigraphic attribute.

The Rock Physics Template allows for the mapping of reservoir properties to the seismic domain over its three-dimensional x, y, and z co-ordinate extent (3-D). FIG. 6A illustrates, as functions of wellbore depth, an example of conventional reservoir properties derived from wireline data. Track 62 on the left-hand-side, is a lithological description of the well bore which describes the solid component (or rock matrix) of the formation. Track 64 on the right-hand-side, is a fluid description of the rock and describes the fluid contained within the pore space. Here, the effective water saturation (SWE) is scaled by the effective porosity (PHIE). This is a convenient way of combining the fluid information as it shows the amount of water saturation, or indirectly the hydrocarbon saturation, contained within the pore space as a function of depth down the borehole. The petrophysical properties are needed for the conditioning of the wireline data as described above in step 42.

Figure 7:
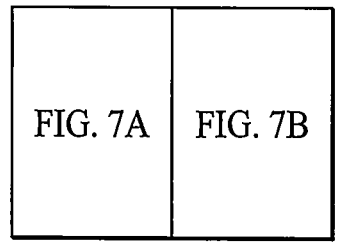
FIG. 7 is a diagram depicting the relation between FIGS. 7A and 7B.
Figure 7A:
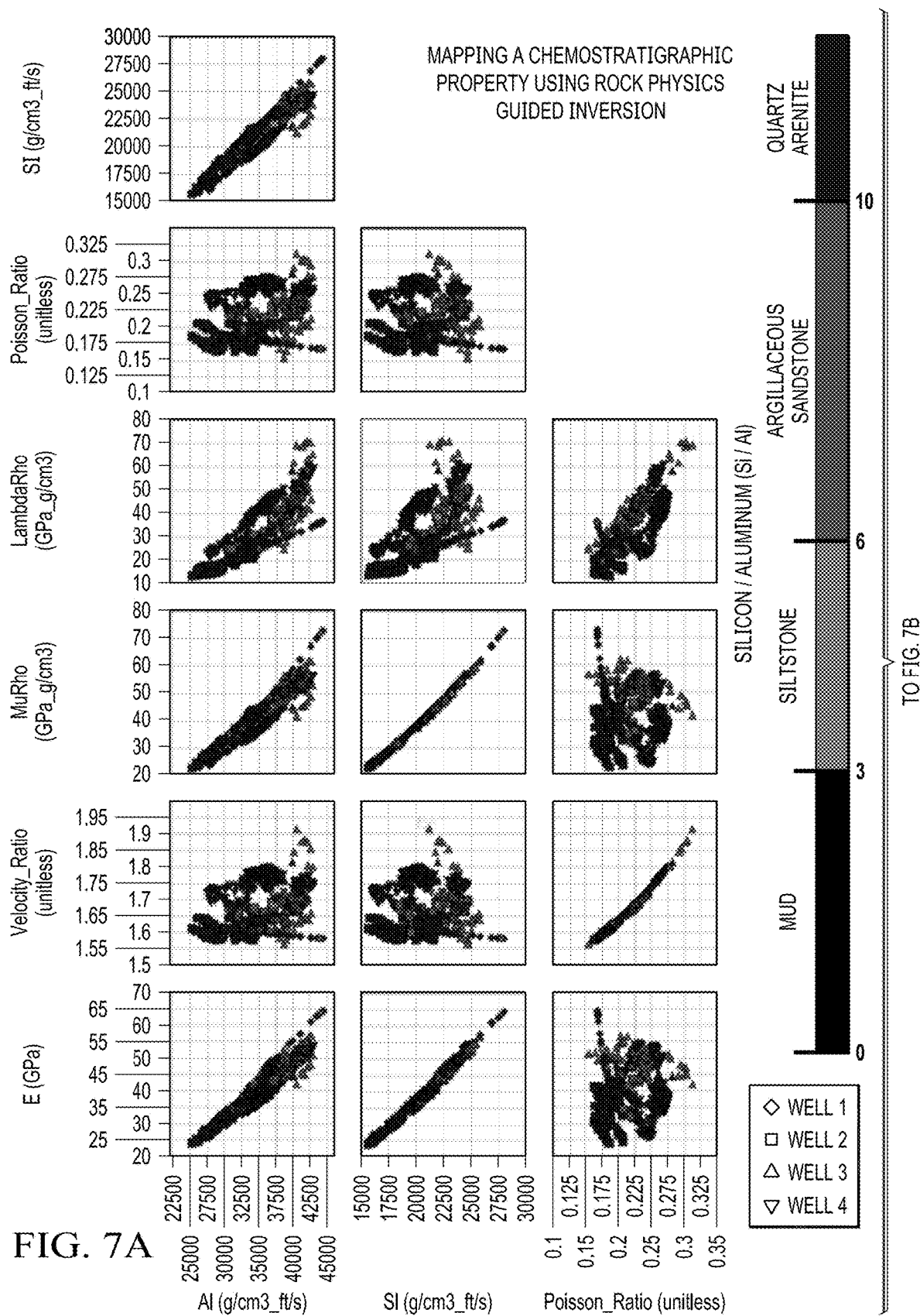
FIGS. 7A and 7B together form an example display of results of elastics attribute analysis based on chemostratigraphic analysis of wells in an actual reservoir.
Figure 7B:
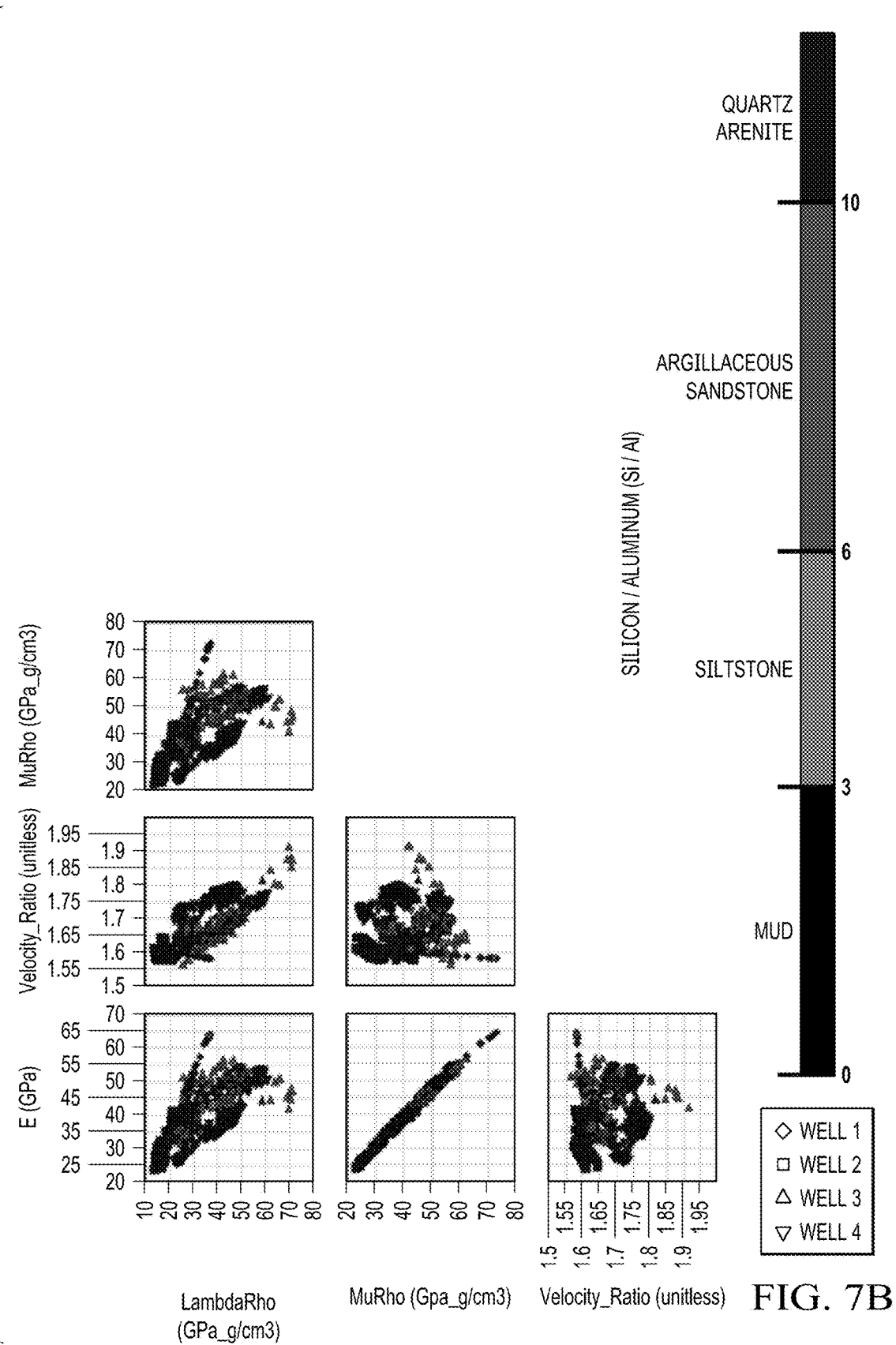

FIGS. 7A and 7B considered together are an example of mapping chemostratigraphic properties according to the present invention using rock physics guided inversion in the manner described above. FIGS. 7A and 7B show combinations of angle dependent, as well as angle independent, elastic attributes obtainable by means of a pre- or post-stack inversion according to the present invention. The data is color-keyed by numerical values of a chemostratigraphic property (in this case a Silicon/Aluminum ratio) with symbols shown in FIGS. 7A and 7B differentiating the well logging data measures from the four different wells. A clustering of the data by color indicates potential viability that the chemostratigraphic property can be mapped using inverted seismic impedance data. Here, the values of the ratio in FIGS. 7A and 7B indicate facies (e.g., mud, siltstone, argillaceous sandstone and quartz arenite).

Figure 8A:
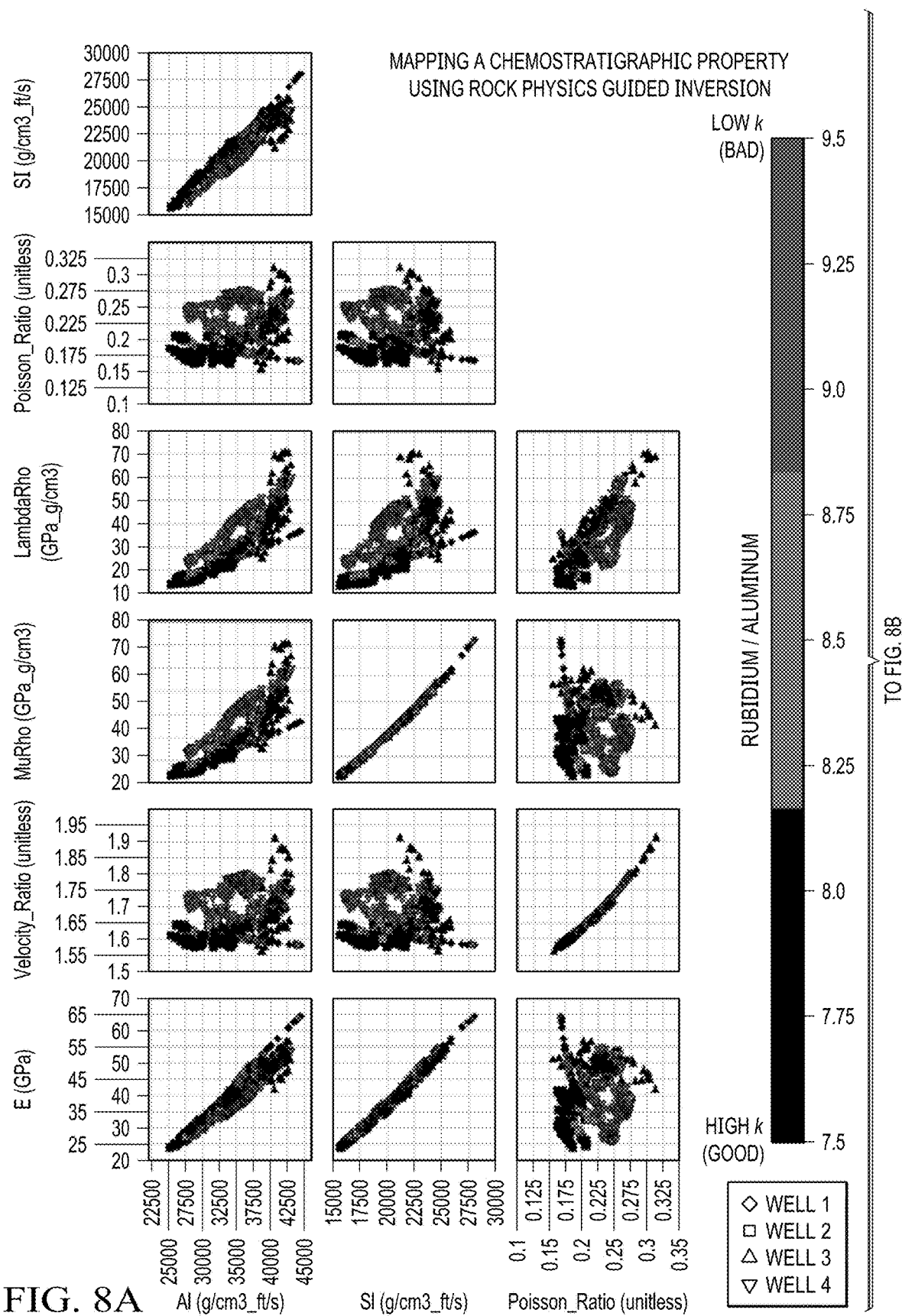
FIGS. 8A and 8B together form another example display of a multi-attribute template according to the present invention.
Figure 8B:
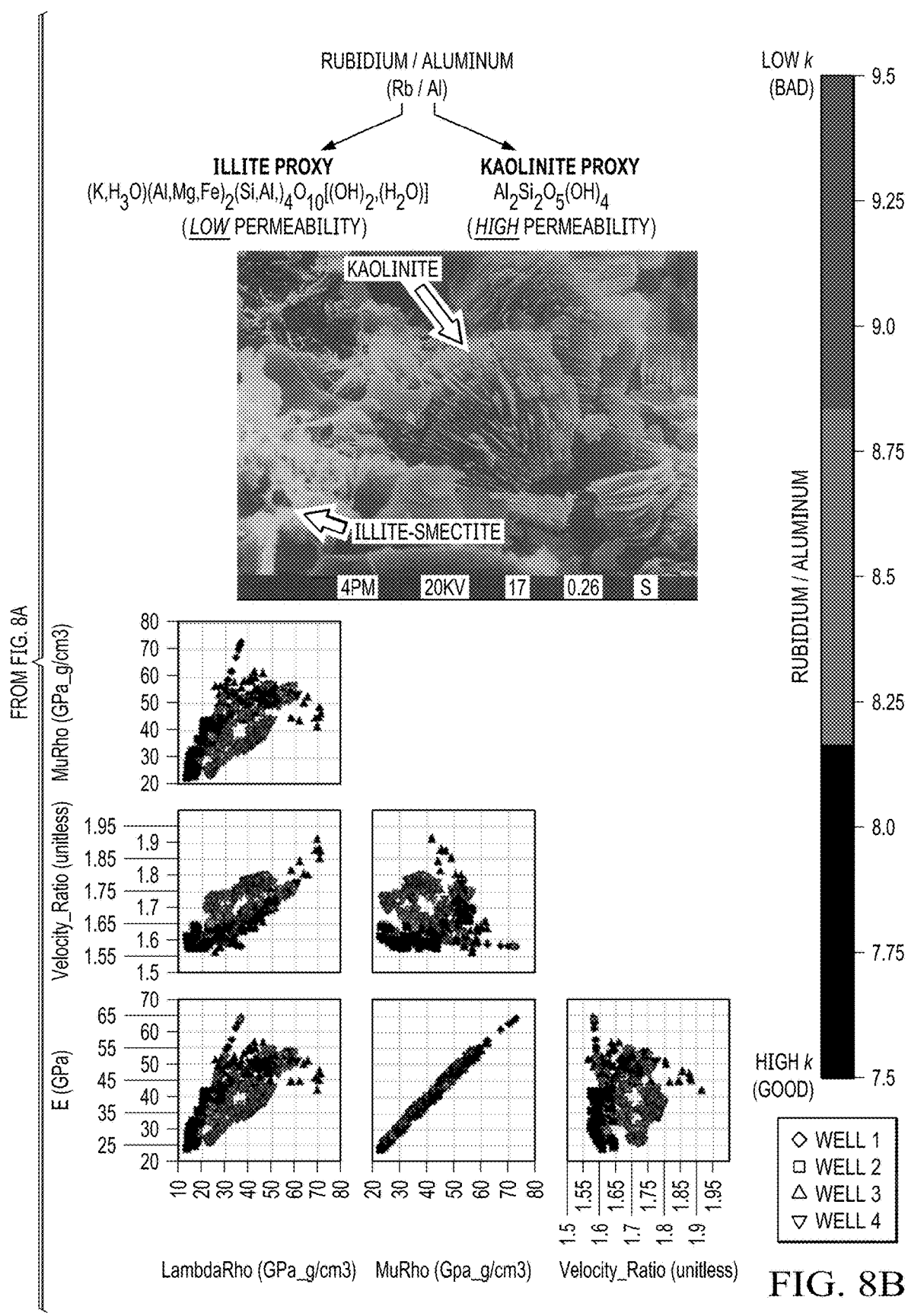

FIGS. 8A and 8B are an example of mapping chemostratigraphic properties according to the present invention using rock physics guided inversion of an unconventional (tight) shale reservoir composed of clays, mainly kaolinite and illite. In such geological structure, a Rubidium/Aluminum ratio can be exploited to highlight predominant areas of kaolinite or illite. Kaolinite generally has a higher permeability (tubular structure) than illite (honeycomb structure) and this fact can therefore be utilized in turn to highlight areas of higher permeability (k). The higher permeable zones also indicate optimal fracture locations for enhanced oil recovery. A multi-attribute Rock Physics Template such as that of FIG. 3 highlights optimum attribute ranges to be applied to the inverted seismic volumes in order to isolate, in this case, the higher porosity zones in the reservoir.

However, in the case of the Rubidium/Aluminum chemostratigraphic property the optimum zones will be those with low occurrences of the Rubidium/Aluminum ratio, as these areas will be indirectly highlighting potential zones of higher permeability.

Figure 9:
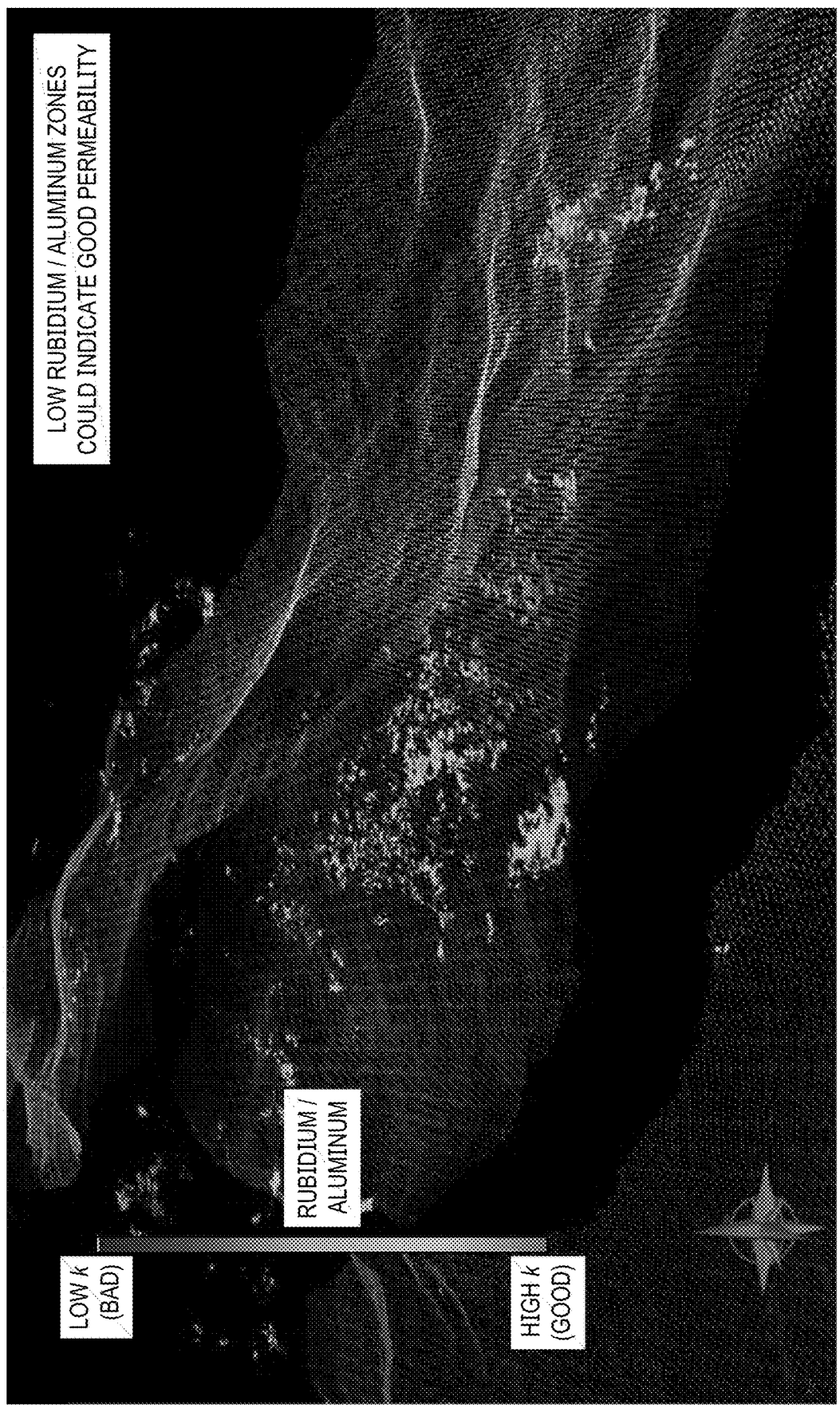
FIG. 9 is an example of an output display map of a subsurface reservoir containing measures of chemostratigraphic features of rock formations at areas of interest according to the present invention.

Finally, FIG. 9 highlights the chemostratigraphic bodies (or chemical geo-bodies) of a subsurface reservoir over its three-dimensional x, y, z co-ordinate (3-D) extent by means of rock physics guided inversion according to the present invention. FIG. 9 is an example of an output display map of a subsurface reservoir containing measures of chemostratigraphic features of rock formations at areas of interest according to the present invention. In the display of FIG. 9, the same Rubidium/Aluminum relative presence ratio of the Rock Physics Template of FIGS. 8A and 8B is mapped. The Rubidium/Aluminum relative presence ratio is indicative of permeability (k) of reservoir formation. High values of the Rubidium/Aluminum relative presence ratio are potentially indicative of lower permeabilities. Conversely, low values of the Rubidium/Aluminum relative presence ratio are potentially indicative of higher permeabilities. The output display map of FIG. 9 is color-keyed by numerical values of the Rubidium/Aluminum relative presence ratio over the three-dimensional x, y, z co-ordinate extent of the reservoir in which the four wells are drilled. Thus, the regions of the reservoir at co-ordinates between wells and color-keyed as indicated in green are indicated as prospects for drilling of wells according to step 58 (FIG. 4).

From the foregoing, it can be seen that the present invention provides a new and improved method for highlighting previously unknown subsurface, hydrocarbon-bearing reservoir locations. The method maps the chemostratigraphic signatures in-between the exploration wells by means of a rock physics guided seismic inversion. Wireline well logging measures, obtained from a number of wells penetrating a reservoir, describe the properties of the in situ subsurface reservoir. The elastic wireline data (i.e., compressional wave velocity $V_P$, shear wave velocity $V_s$ and bulk density $\rho$) at the exploration well locations are important as these data types are fundamental to elastic wave propagation as recorded by the seismic reflectivity data. Conventionally, the wireline data are processed to derive the reservoir properties (e.g., porosity, water saturation and volumetric analysis).

Rock Physics Templates are constructed based on the high-resolution well data, and relationships between the reservoir properties and the elastic properties are then derived at the wells, which is a methodology aiming to tie the well data to the seismic data at the well locations. The derived rock property relationships from this process can then be utilized to map the reservoir properties in three dimensions using the inverted seismic impedance data.

The present invention thus maps the chemostratigraphic properties using rock physics guided seismic inversion. A chemostratigraphic analysis of core and cutting samples from the wells penetrating the reservoir is performed to indicate the relative presence of chemical elements as a function of depth down the wells. A pre-stack seismic inversion of the three-dimensional seismic reflectivity data is performed to obtain the acoustic and shear impedance cubes encapsulating the reservoir of interest. Indications of attribute ranges of interest in the formation are obtained from the Rock Physics Templates.

The chemostratigraphic signature is then mapped over its three-dimensional extent using a Rock Physics Template constructed by relating the elastic wireline data to the seismic impedance and chemostratigrapy data at the well locations. The result is a three-dimensional geo-body, representing the chemical signature of the reservoir, which are then proxies for important hydrocarbon reservoir attributes, which in turn reduces the drilling risk significantly. A well is then drilled in the subsurface geological structure to a location in a subsurface hydrocarbon reservoir identified by a suitable chemostratigraphic signature.

The modelling method of the present invention allows for additional information of the nature and characteristics of subsurface rock of the formations of a hydrocarbon reservoir, and the properties of such rock. The results obtained with the present invention are important for hydrocarbon exploration and development of a reservoir. The 3-D chemical geo-bodies resulting according to the present invention are indirect proxies for extremely useful reservoir properties which have been difficult to quantify (e.g., facies) up to now with conventional technologies and in some cases (e.g., permeability) not even possible to quantify.

The present invention develops and utilizes chemostratigraphic data measures as a reservoir data type to map the chemical properties of a reservoir. These chemical properties, if mapped in 3-D between the wells, are then used to, for example, map the permeability of the reservoir, which has up to now not been possible using conventional methodologies.

The present invention provides a capability to describe the chemistry of reservoir rocks using the physics of wave propagation, so far as is known, for the first time in the industry. The identifications of chemistry in the reservoir rocks at the locations indicated in turn are indirect proxies for reservoir properties, for example permeability. Permeability proxies can be mapped with the proposed workflow which has not available previously.

The invention has been sufficiently described so that a person with average knowledge in the field of reservoir modeling and simulation may reproduce and obtain the results mentioned in the invention herein. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there can be improvements and modifications made of the present invention described in detail above without departing from the spirit or scope of the invention as set forth in the accompanying claims.

What is claimed is:

1. A method of drilling a well in a subsurface geological structure to a location in a subsurface hydrocarbon reservoir indicated by rock physics modeling of chemostratigraphic signatures of formations of the subsurface hydrocarbon reservoir over its three-dimensional extent to indicate reservoir properties, comprising the steps of:
    identifying wells that penetrate the reservoir and are within a seismic area;
    obtaining, for the wells identified, the following data:
        seismic survey data for the seismic area;
        elastic wireline log data comprising elastic wireline data that comprises compressional wave velocity log data for the wells in the reservoir, shear wave velocity log data for the wells in the reservoir, and formation density for the wells in the reservoir; and
        core data that is indicative of properties of core samples or cutting samples obtained from the wells;
    performing, based on the elastic wireline log data, a geophysical well log analysis to determine elastic attributes comprising:
        relationships of compressional wave velocity versus shear wave velocity for the wells; and
        relationships of compressional wave velocity versus bulk density for the wells;
    performing, based on the core data, a chemostratigraphic analysis to generate chemostratigraphic data that is indicative of relative presence of oxides of different chemical elements as functions of well depth in the reservoir;
    performing, based on the chemostratigraphic data and the elastic attributes, a seismic inversion assessment that comprises identifying possible combinations of elastic attributes obtainable by way of a pre-stack or post-stack inversion;
    determining, based on the possible combinations of elastic attributes identified, that a pre-stack type seismic inversion or post-stack type seismic inversion is to be employed;
    performing a seismic inversion of the seismic survey data to generate formation attributes that are indicative of chemostratigraphic properties of reservoir regions located between wells in the reservoir, the seismic inversion being of the type of seismic inversion identified;
    mapping, based on the formation attributes, a rock physics model identifying chemostratigraphic properties of formations of the subsurface hydrocarbon reservoir over its three-dimensional extent that indicate one or more reservoir regions located between wells in the reservoir as prospects for drilling of a well; and
    drilling, in one of the one or more regions indicated by the mapping of the rock physics model, the well.

2. The method of claim 1, wherein the mapped rock physics model identifying chemostratigraphic signatures of formations indicates reservoir regions of increased production of hydrocarbons from the reservoir.

3. The method of claim 1, wherein the rock physics model identifying chemostratigraphic signatures of formations indicates reservoir regions of decreased production of hydrocarbons from the reservoir.

4. The method of claim 1, wherein the well comprises an exploration well.

5. The method of claim 1, wherein the well comprises a production well.

6. The method of claim 1, wherein the step of performing a chemostratigraphic analysis comprises performing a chemostratigraphic analysis of core or cutting samples from the wells in the reservoir to indicate relative presence of oxides of different chemical elements and ratios of oxides of the different chemical elements as functions of well depth in the reservoir.

7. The method of claim 1, wherein the oxides of the different chemical elements comprise oxides of rare earth elements.

8. The method of claim 1, wherein the oxides of the different chemical elements comprise oxides of trace elements.

9. A method of drilling a well in a subsurface geological structure to a location in a subsurface hydrocarbon reservoir indicated by rock physics modeling of chemostratigraphic signatures of formations of the subsurface hydrocarbon reservoir over its three-dimensional extent to indicate reservoir properties, comprising the steps of:

obtaining, for wells that penetrate the reservoir and are within a seismic area, the following data:
  seismic survey data for the seismic area;
  elastic wireline log data comprising elastic wireline data that comprises compressional wave velocity log data for the wells in the reservoir, shear wave velocity log data for the wells in the reservoir, and formation density for the wells in the reservoir; and
  core data that is indicative of properties of core samples or cutting samples obtained from the wells;
performing, based on the elastic wireline log data, a geophysical well log analysis to determine elastic attributes comprising:
  relationships of compressional wave velocity versus shear wave velocity for the wells; and
  relationships of compressional wave velocity versus bulk density for the wells;
performing, based on the core data, a chemostratigraphic analysis to generate chemostratigraphic data that is indicative of relative presence of chemical elements and ratios of different chemical elements as functions of well depth in the reservoir;

performing, based on the chemostratigraphic data and the elastic attributes, a seismic inversion assessment that comprises identifying possible combinations of elastic attributes obtainable by way of a pre-stack or post-stack inversion;

determining, based on the possible combinations of elastic attributes identified, that a pre-stack type seismic inversion or post-stack type seismic inversion is to be employed;

performing a seismic inversion of the seismic survey data to generate formation attributes that are indicative of chemostratigraphic properties for reservoir regions located between wells in the reservoir;

mapping a rock physics model of chemostratigraphic properties of formations of the subsurface hydrocarbon reservoir over its three-dimensional extent that indicate one or more reservoir regions located between wells in the reservoir as prospects for drilling of a well; and drilling, in one of the one or more regions indicated by the mapping of the rock physics model, the well.

* * * * *